US006615534B1

(12) United States Patent
Smithyman et al.

(10) Patent No.: US 6,615,534 B1
(45) Date of Patent: *Sep. 9, 2003

(54) GAS FUMIGATION METHOD AND SYSTEM

(75) Inventors: Dennis Smithyman, Long Valley, NJ (US); Carl W. Schmidt, Downers Grove, IL (US); Sloane R. Six, Wilton, CT (US)

(73) Assignee: Cytec Canada, Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/363,688

(22) Filed: Jul. 30, 1999

Related U.S. Application Data

(62) Division of application No. 08/819,996, filed on Mar. 18, 1997, now Pat. No. 6,047,497.

(51) Int. Cl.⁷ .............................................. A01M 13/00
(52) U.S. Cl. ...................................................... 43/125
(58) Field of Search .......................... 43/125, 129, 130

(56) References Cited

U.S. PATENT DOCUMENTS

| 3,933,813 A | 1/1976 | Beschke et al. |
| 4,200,657 A | 4/1980 | Cook |

(List continued on next page.)

FOREIGN PATENT DOCUMENTS

| DE | 3800697 | 7/1989 |
| EP | 0318 040 A1 | 5/1989 |
| EP | 0320 012 | 6/1989 |
| EP | 0 702 895 A1 | 3/1996 |
| FR | 2 487 638 | 2/1982 |
| FR | 2 531 840 | 2/1984 |
| GB | 2 065 445 | 7/1981 |
| GB | 2 126 087 | 3/1984 |
| GB | 2 177 044 B | 7/1989 |
| GB | 2 250 200 A | 6/1992 |
| WO | 91/00017 | 1/1991 |
| WO | 93/25075 | 12/1993 |
| WO | 94/28746 | 12/1994 |
| WO | 95/19712 | 7/1995 |

OTHER PUBLICATIONS

Division of Entomology CSIRO Biennial Report 1981–83, Canberra, Australia, 1984, pp. 47–49.
Kashi, K.P. et al., "The Toxic Action of Phosphine: Role of Carbon Dioxide on the Toxicity of Phosphine to *Sitophilus Granarius* (L.) and *Tribolium Confusum* DuVal," J. stored Prod. Res. 1975, vol. 11, pp. 9–15.
SIROFLO®, SIROFUME® & SIROCIRC™, better ways to fumigate and protect grain from insect attack, CSIRO, BOC GASES.
Marcotte, Michelle, et al., "Heat, Phosphine and $CO_2$ Collaborative Experimental Structural Fumigation," Canadian Leadership in the Development of Methyl Bromide Alternatives, pp. 1–38.

(List continued on next page.)

*Primary Examiner*—Kurt Rowan
(74) *Attorney, Agent, or Firm*—Finnegan, Henderson, Farabow, Garrett & Dunner, L.L.P.

(57) ABSTRACT

A method and system are disclosed for fumigating at least one region with a nonflammable gaseous mixture including phosphine. A sensor senses the concentration of phosphine for atmosphere of the region and a flow controller controls flow to the region in response to the sensed concentration. A recycling passage removes a portion of the atmosphere from the region and returns the atmosphere to create a recycle flow through the region. In addition, a gas mixing system is provided to supply the non-flammable mixture by mixing phosphine from a phosphine source and an inert substance from an inert substance source.

18 Claims, 2 Drawing Sheets

U.S. PATENT DOCUMENTS

| | | | |
|---|---|---|---|
| 4,215,508 A | 8/1980 | Allen et al. |
| 4,223,044 A | 9/1980 | Se |
| 4,287,171 A | 9/1981 | Jordy et al. |
| 4,331,642 A | 5/1982 | Horn et al. |
| 4,347,241 A | 8/1982 | Kapp |
| 4,412,979 A | 11/1983 | Horn et al. |
| 4,421,742 A | 12/1983 | Friemel et al. |
| 4,548,336 A | 10/1985 | Dove |
| 4,579,714 A | 4/1986 | Gunn |
| 4,597,218 A | 7/1986 | Friemel et al. |
| 4,651,463 A | 3/1987 | Friemel |
| 4,653,644 A | 3/1987 | Sullivan et al. |
| 4,729,298 A | 3/1988 | Dornemann |
| 4,756,117 A | 7/1988 | Friemel |
| 4,812,291 A | 3/1989 | Friemel et al. |
| 4,814,154 A | 3/1989 | Dornemann et al. |
| 4,853,241 A | 8/1989 | Dornemann |
| 4,889,708 A | 12/1989 | Latif et al. |
| 4,989,363 A | 2/1991 | Dornemann |
| 5,015,475 A | 5/1991 | Kapp et al. |
| 5,098,664 A | 3/1992 | Schellhaas et al. |
| 5,163,361 A | 11/1992 | Fox et al. |
| 5,203,108 A | 4/1993 | Washburn, Jr. |
| 5,260,022 A | 11/1993 | Schellhaas et al. |
| 5,353,544 A | 10/1994 | Tsutsumi et al. |
| 5,400,382 A | 3/1995 | Welt et al. |
| 5,403,597 A | 4/1995 | Mueller |
| 5,411,704 A | 5/1995 | Schellhaas et al. |
| 5,417,921 A | 5/1995 | Dove et al. |

OTHER PUBLICATIONS

Ripp, B.E., "Cost Comparisons of Different Insect Control Measures," Controlled Atmosphere and Fumigation in Grain Storages, Amsterdam, Elsevier, 1984, pp. 481–487.

Jones, R.M., "Toxicity of Fumigant–$CO_2$ Mixtures to the Red Flour Beetle," Journal of Economic Entomology, vol. 31, No. 2, Apr., 1938, pp.298–309.

Desmarchelier, Dr. J.M., "Effect of Carbon Dioxide on the Efficacy of Phosphine Against Different Stored Product Insects," Mitteilungen aus der Biologischen Bundesanstalt für Land–und Forstwirtschaft, Berlin–Dahlem, Jul., 1984, pp.3–57.

Proceedings of the Entomological Society of Washington, vol. 31, No. 5, May, 1929, pp. 96–103.

Phillips, G.L., "The Value of Forced Circulation in the Fumigation of Bulk Commodities in Freight Cars," Down to Earth, Spring, 1953, pp. 13–15.

Calderon, M., et al., "Fumigation Trials with a Mixture of Methy Bromide and Carbon Dioxide in Vertical Bins," J. stored Prod. Res., 1973, vol. 8, pp. 315–321.

Kashi, Kattera, "Toxicity of Phosphine to Five Species of Stored–product Insects in Atmospheres of Air and Nitrogen," Pestic. Sci. 1981, 12, pp. 116–122.

Monro, H.A.U., "The History of the Use of the Recirculation Method for Applying Fumigants in Grain Storage," Down to Earth, Spring, 1956, pp. 19–21.

Redlinger, L.M., "Studies of Fumigating Rice in Flat Storage by the Forced Circulation Method," The Rice Journal, vol. 60, No. 3, Mar., 1957, pp. 18–23.

Aliniazee, Taskeen, M., "The Effect of Carbon Dioxide Gas Alone or in Combinations on the Mortality of *Tribolium castaneum* (Herbst) and T. confusum du Val (Coleoptera, Tenebrionidae)," J. stored Prod. Res., 1971, vol. 7, pp. 243–252.

Kashi, Kattera P., "Response of Five Species of Stored–product Insects to Phosphine in Oxygen–deficient Atmospheres," Pestic. Sci. 1981 12, pp. 111–115.

Roth, Herbert, "Fumigation with Ethylene Oxide–Carbon Dioxide Mixture for Quarantine Control of the Giant African Snail," Journal of Economic Entomology, vol. 64, No. 1, Feb., 1971, pp.341–342.

Whitney, W. Keith, "Distribution and Sorption of Liquid Fumigants Applied to Wheat by Recirculation," Journal of Economic Entomology, vol. 53, No. 2, Apr., 1960, pp. 259–261.

Storey, Charles L., "Effect of Temperature and Commodity on Distribution of $CCl_4$–$CS_2$ (80:20) and EDC–$CCl_4$ (75:25) Applied by Gravity Penetration and Closed Recirculation," Journal of Economic Entomology, vol. 64, No. 1, Feb., 1971, pp. 227–231.

Howe, R.G. et al., "Forced Recirculation Control of Stored–Grain Insects," Down to Earth, Winter, 1958, pp. 6–9.

Division of Entomology CSIRO Biennial Report 1983–85, Canberra, Australia, 1986, p. 46.

Division of Entomology CSIRO Biennial Report 1985–87, Canberra, Australia, 1988, pp. 8.11.

Lindgren, David L., "Sorption of Single– and Multiple–Component Fumigants by Whole–Kernel Corn under Recirculation, and Correlated Mortality of Stored–Product Insects," Journal of Economic Entomology, vol. 52, No. 6, Dec., 1959, pp. 1091–1097.

Ripp, B.E., "Response of Several Species of Insects to Mixtures of Phosphine and Carbon Dioxide," Controlled Atmosphere and Fumigation in Grain Storages, Elsevier, 1984, pp. 75–81.

Boland, F.B., "Phosphine Fumigations in Silo Bins," pp. 425–430.

Cook, J.S., "The Use of Controlled Air to Increase the Effectiveness of Fumigation of Stationary Grain Storages," pp. 419–424.

Storey, C.L., "Comparative Study of Methods of Distributing Methyl Bromide in Flat Storages of Wheat: Gravity–Penetration, Single–Pass, and Closed–Recirculation," Marketing Research Report 794, U.S. Dept. of Agriculture, Aug., 1967, pp. 1–16.

Bond, E.J., "Control of Insects with Fumigants at Low Temperatures: Toxicity of Fumigants in Atmospheres of Carbon Dioxide," Journal of Economic Entomology, vol. 71, No. 2, 1978, pp. 307–309.

Kashi, K.P., "The Toxic Action of Phosphine: Role of Carbon Dioxide on the Toxicity of Phosphine to *Sitophilus Granarius* (L.) and *Tribolium Confusum* DuVal," J. stored Prod. Res. 1975, vol. 11, pp. 9–15.

Ripp, B.E., "The Flammability Limit of Pure Phosphine–Air Mixtures at Atmospheric Pressure," Controlled Atmosphere and Fumigation in Grain Storages, 1984, pp. 433 & 447.

Storey, "A Portable Recirculation System for Fumigating Bulk Products in Freight Cars," Marketing Bulletin No. 24, U.S.D.A., May 1963, pp. 2–4.

Phosfume™, Phosphine Fumigant, BOC GASES, Nov., 1995.

Phosfume™, brochure, BOC GASES, 1995.

Winks, R.G., "Flow–Through Phosphine Fumigation—A New Technique," Stored Grain Protection Conference, 1983. Section 5.1.

GAS FUMIGATION METHOD AND SYSTEM

This application is a divisional of U.S. application Ser. No. 08/819,996 filed Mar. 18, 1997, now U.S. Pat. No. 6,047,497.

BACKGROUND OF THE INVENTION

1. Field of the Invention

The present invention relates to a gas fumigation method and system. More particularly, the present invention relates a method and system for fumigating a region with a non-flammable gaseous mixture containing phosphine.

2. Description of Related Art

In agricultural and food processing industries, infestation by pests, such as rodents and insects, can cause significant problems. Pests can contaminate stored crops or food products rendering them unfit or unappealing for use. Pests consuming products not only cause a loss of inventory, but also may damage products and thereby reduce the product value.

Current means of controlling pests involve the use of fumigants and product protectants. Fumigants are used to eliminate pests inhabiting a product, and protectants are used on pest free products to reduce the risk of infestation.

One type of fumigant is the chemical phosphine ($PH_3$). Phosphine is a poisonous and highly flammable gas capable of self ignition under certain atmospheric conditions. Phosphine gas is advantageous because it does not leave a significant residue on a product after being used as a fumigant.

Phosphine gas is typically generated using a metal phosphide, such as aluminum phosphide or magnesium phosphide, often in the form of pellets or tablets optionally placed in gas permeable packets. When exposed to moisture, typically ambient humidity, phosphine gas is generated. The generation of phosphine gas is dependent not only on the available moisture, but on temperature and time as well. Because metal phosphide does not react as rapidly at lower temperatures, this material is not generally used at temperatures below 40 degrees Fahrenheit. The time required to generate the available phosphine gas can range from 2 to 8 days depending on the temperature. The control of phosphine concentrations resulting from the reaction is difficult, and a wide range of concentrations are produced.

A common fumigation process using metal phosphides involves placing the material in contact with stored product to be treated, such as on top of the product or buried within the product. A number of methods can be used to facilitate distribution of phosphine gas throughout the product and supply the necessary moisture for supporting the reaction.

The use of metal phosphides creates a hazardous environment for individuals conducting fumigation. As soon as these materials are exposed to atmospheric moisture, the reaction begins to release flammable and toxic phosphine gas. Because workers can be immediately exposed to the gas, protective clothing and breathing equipment are necessary. In addition, individuals often must work in a confined space, and multiple workers are required to expedite the process and to provide rescue if needed.

Once started, the generation of phosphine gas will continue until either all of the metal phosphide has reacted, or the moisture supporting the reaction is eliminated. Eliminating the moisture would, in theory, require removal of the materials from an area being fumigated and placement in a suitable sealed container. This container would have to be capable of accepting the phosphine gas still being generated as the available moisture is used. This is not done in practice because of the high potential for explosions resulting from self igniting phosphine concentrations.

Once the fumigation is complete, the residual material from the metal phosphide reaction must be removed from the fumigated area. These remaining materials must be treated to ensure that all of the available phosphine gas has been generated, a process which can still result in flammable and toxic vapors. The residues from the treatment must be packaged and prepared for proper disposal.

Use of metal phosphides is not limited to their direct placement in contact with a stored product. Means to react the material outside of a storage region have been developed and used, however, special care must be taken to limit the phosphine concentrations to prevent flammable or self igniting mixtures in air.

After an area is fumigated to destroy pests, certain measures must often be taken to protect the stored product from reinfestation. The current means for protecting products from reinfestation involve spraying liquid chemicals directly onto the products.

The application of chemical protectants is most effective when done while the stored product is in motion, for example, during the loading of a storage container or vessel. This facilitates the distribution of the protectant throughout the product. Application of the chemical after the product is in storage requires movement of all of the product, for example, to another storage container. This requires additional storage space, and the movement sometimes results in physical damage to the product.

Chemical protectants are often mixed with water or other dilutents to establish a suitable concentration at the facility where they are applied. Steps must be taken to ensure that the diluted chemical remains mixed and that the mixture is used within a short period of time after preparation. Handling of such chemicals is hazardous to humans, and special precautions must be taken to ensure worker safety. These chemicals are also hazardous to the environment, and wastes resulting from their use must be properly disposed.

Phosphine gas also has the potential of being used as a protectant chemical. At sufficient concentrations, phosphine can reduce the chances of reinfestation of a stored product. Introduction of phosphine into a storage can provide desired protection without the need to move the product. Phosphine can be used over a long period of time to provide the desired protection, whereas the effectiveness of liquid chemical protectants decreases to zero with time.

When phosphine is mixed with other gases, the resulting mixture can be effective as a fumigant or protectant, while simultaneously eliminating the flammability hazards. For example, U.S. Pat. No. 4,889,708, which is incorporated by reference in its entirety, discloses a pressurized mixture of a diluent gas and phosphine gas in a container adapted to release the mixture of gases during fumigation. However, there is a need for systems capable of managing the flow of such gaseous mixtures during fumigation of particular areas. In addition, there is a need for systems capable of mixing gases on site during fumigation to allow for separate supply of components of the mixtures.

In light of the foregoing, there is a need in the art for improving fumigations by limiting potentially flammable concentrations of phosphine, reducing worker risk, eliminating the need to retrieve, treat, and dispose of metal phosphide materials, having the ability to stop the introduction of phosphine at will, and producing phosphine gas independently of environmental conditions. Furthermore, there is a need in the art for providing protection to stored products over extended periods of time.

SUMMARY OF THE INVENTION

Accordingly, the present invention is directed to a gas fumigation method and system that substantially obviate one or more of the limitations of the related art. In particular, the present invention is directed to gas fumigation with non-flammable gaseous mixtures containing phosphine and at least one inert gas.

To achieve these and other advantages and in accordance with the purpose of the invention, as embodied and broadly described herein, the invention includes a gas fumigation method comprising the steps of flowing phosphine from a phosphine source, flowing an inert substance from an inert substance source, mixing the phosphine and the inert substance to form a gaseous mixture, controlling at least one of flow of the phosphine from the phosphine source and flow of the inert substance from the inert substance source so that the gaseous mixture is non-flammable in air, and passing the gaseous mixture into at least one region to fumigate the region.

In another aspect, a system for gas fumigating at least one region is provided. The system includes a phosphine source, an inert substance source, a mixer fluidly coupled to the phosphine source and the inert substance source to form a gaseous mixture including phosphine flowing from the phosphine source and inert substance flowing from the inert substance source, the gaseous mixture passing from the mixer to the region during gas fumigation, and a flow controller controlling at least one of flow of the phosphine from the phosphine source to the mixer and flow of the inert substance from the inert substance source to the mixer so that the gaseous mixture is non-flammable in air.

In a further aspect, a method of fumigating at least one product storage region is provided. The method includes the steps of removing a portion of atmosphere from the region and returning the portion back to the region so as to create recycle flow of the atmosphere through the region, flowing a gaseous mixture from a source of the gaseous mixture to the region, the gaseous mixture including phosphine and being non-flammable in air, sensing concentration of phosphine for the atmosphere of the region, and controlling flow of the gaseous mixture to the region based on the sensed concentration of phosphine to form a pesticidal concentration of phosphine in the region.

In an additional aspect the present invention, a system for fumigating at least one product storage region is provided. The system includes a source of a gaseous mixture capable of fumigating pests, the gaseous mixture including phosphine and being non-flammable in air, a sensor for sensing concentration of phosphine for atmosphere of the region, a flow controller for controlling flow of the gaseous mixture from the source to the region based on the sensed concentration of phosphine to form a pesticidal concentration of phosphine in the region, and a recycling passage for removing a portion of the atmosphere from the region and returning the portion back to the region so as to create recycle flow of the atmosphere through the region.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
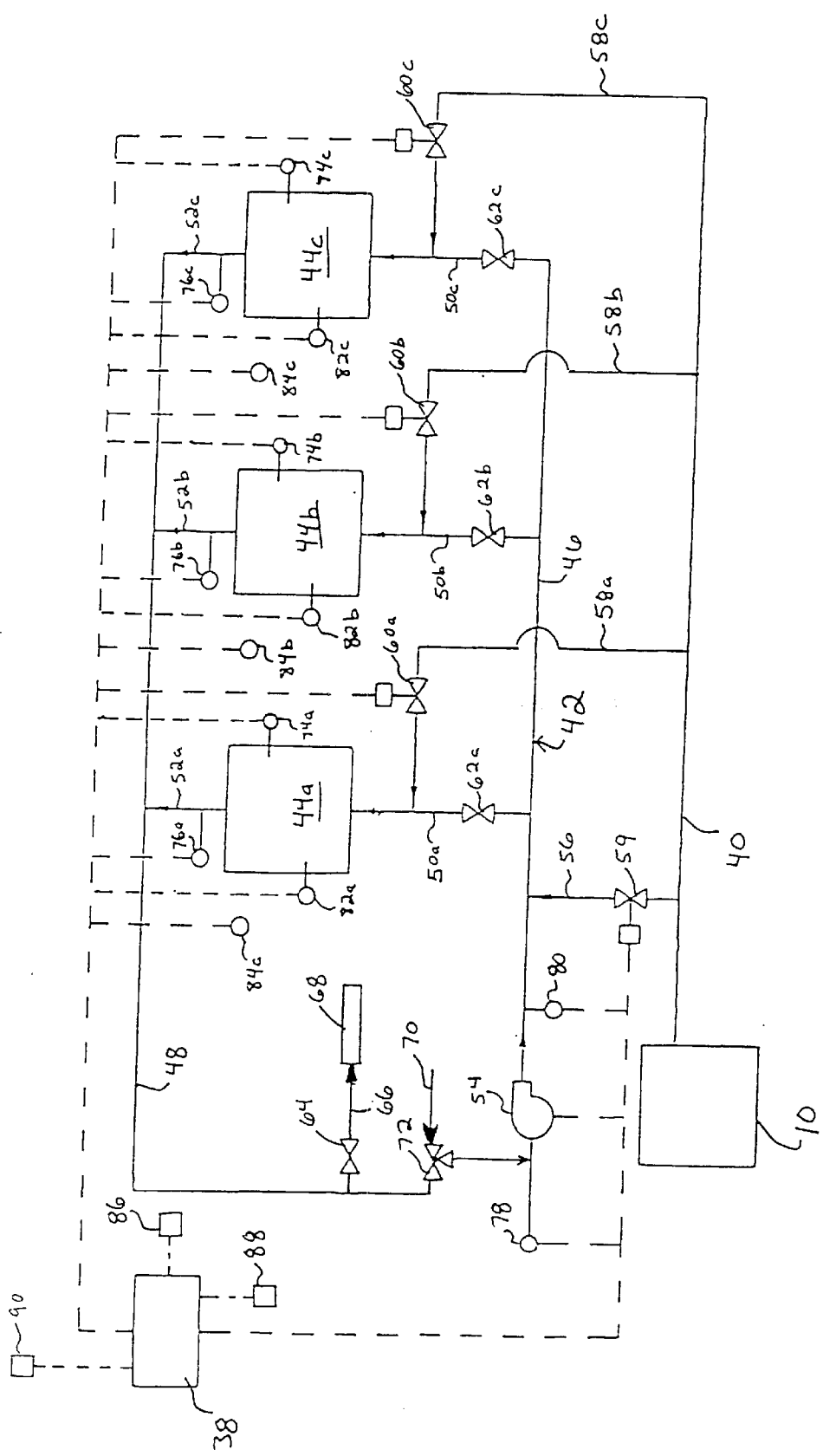
FIG. 1 is a schematic view of a gas fumigation system in accordance with an embodiment of the invention wherein broken lines represent electrical interconnections and unbroken lines represent fluid couplings.

Reference will now be made in detail to the present preferred embodiments of the invention, examples of which are illustrated in the accompanying drawings. Wherever possible, the same reference numbers are used in the drawings and the description to refer to the same or like parts.

In accordance with the invention, there is provided a gas fumigation system. As shown in FIG. 1, the fumigation system includes a source 10 of a fumigant gas mixture, a plurality of regions 44a, 44b, and 44c, a recycling passage 42 for recycling atmosphere through the regions 44a–44c, and a supply line 40 for supplying the gaseous mixture to the recycling passage 42 and the regions 44a–44c to fumigate the regions 44a–44c.

The regions 44a–44c are any type of partially enclosed or enclosed areas in which gas fumigation is desired. Normally, the walls of the regions 44a–44c allow for some leakage of gas from the regions 44a–44c, however the invention may also be used for gas tight enclosures. In one embodiment of the invention, the regions 44a–44c are storage areas, such as silos, for food products or agricultural crops, such as grain. In another embodiment of the invention, the regions 44a–44c are areas on a vehicle, such as a compartments on a truck or a railroad car. The present invention can be practiced to fumigate a number of different types of regions 44a–44c and any number of different types of products stored in each of the regions 44a–44c.

In a preferred embodiment of the invention, the gaseous mixture provided from the source 10 includes phosphine mixed with one or more inert gases, such as carbon dioxide and/or nitrogen, which are non-flammable in air. Preferably, the gaseous mixture provided by the source 10 includes a sufficient amount of the inert gas to dilute the phosphine sufficiently enough to render the mixture itself non-flammable in air. The use of a non-flammable gaseous mixture is significantly safer than gas fumigation processes in which high concentrations of flammable phosphine are used. In addition, when carbon dioxide is one of the inert gases blended in the mixture, the carbon dioxide acts synergistically with the phosphine in the mixture to enhance pest fumigation and limit the amount of required phosphine.

One suitable mixture provided by the source 10 includes phosphine in an amount of less than about 3.1% by volume with a remainder of the mixture being inert gas, such as carbon dioxide and/or nitrogen. Another suitable mixture includes phosphine in an amount of less than about 5% by volume with an inert gas remainder. In addition, the non-flammable gaseous mixture in the source 10 may be any of the gaseous mixtures disclosed in above-mentioned U.S. Pat. No. 4,889,708.

In one embodiment of the invention, the source 10 is a pressure vessel containing the non-flammable gaseous mixture. Such a source is advantageous when the gaseous mixture is blended at an off-site location and transported to where fumigation is to take place. With this arrangement, the potentially dangerous generation of phosphine is confined to a facility having sufficient safety measures for handling flammable concentrations of phosphine. Use of a pressure vessel containing the gaseous mixture also does not require transportation of flammable concentrations of phosphine.

When the gaseous mixture source 10 includes a pressure vessel containing the non-flammable gaseous mixture, the source 10 optionally includes a vaporizer (not shown) to heat the mixture and thereby change its phase from a liquid to a gas. In addition, the source 10 may also include a regulator (not shown) for reducing pressure of gaseous mixture flowing from the source 10, and 6 filter (now shown) for removing any particles capable of clogging the regulator.

Figure 2:
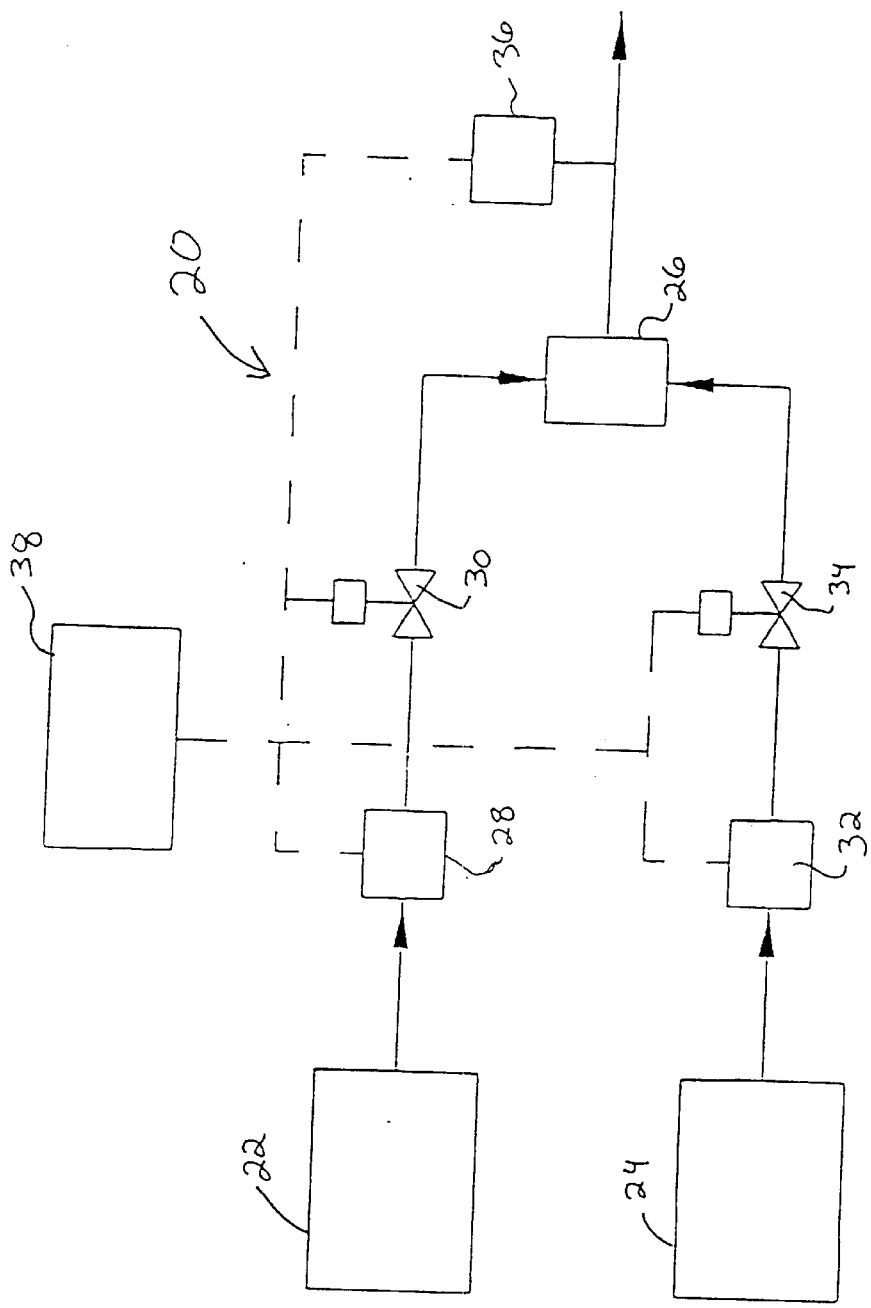
FIG. 2 is a schematic view gas mixing system for use with the gas fumigation system of FIG. 1.

In another embodiment, the gaseous mixture source 10 includes a gas mixing system 20 shown in FIG. 2. The gas mixing system 20 includes a source 22 of the inert substance, a source 24 of phosphine, and a gas mixer 26 fluidly coupled to the sources 22 and 24 to blend inert substance flowing from the inert substance source 22 with phosphine flowing from the phosphine source 24.

The inert substance source 22 is preferably a pressure vessel containing an inert substance such as carbon dioxide, nitrogen, or a mixture of carbon dioxide and nitrogen. Alternatively, the inert substance source 22 is an inert substance generator capable of generating carbon dioxide or nitrogen on site, for example, in a separation process or in a chemical reaction. When the inert substance in the inert substance source 22 is initially in liquid form, such as when the inert substance is pressurized in a pressure vessel, a vaporizer (not shown) is preferably located between the inert substance source 22 and the mixer 26 to heat the inert substance and thereby change its phase from a liquid to a gas.

The phosphine source 24 is preferably a pressure vessel containing substantially pure phosphine. Alternatively, the phosphine source 24 is a phosphine generator capable of generating phosphine, for example, from the reaction of metal phosphide and water. When the phosphine source 24 is a phosphine generator, an unfilled pressure vessel (not shown) is also preferably in selective fluid communication with the source 24 to store excess phosphine produced in the generator.

The gas mixer 26 is a static or dynamic gaseous mixer capable of inducing turbulent flow for mixing. For example, the gas mixer 26 may be a "T" shaped connector, a length of tubing having internal baffles, or a length of tubing having a segment of chain in its flow path to cause blending of the inert substance flowing from the inert substance source 22 and the phosphine flowing from the phosphine source 24.

As shown in FIG. 2, an inert substance flow meter 28 and an inert substance flow valve 30 are positioned between the inert substance source 22 and the gas mixer 26 to measure the flow rate of inert substance flowing from the source 22 and to vary the rate of flow, respectively. Similarly, a phosphine flow meter 32 and phosphine flow valve 34 are positioned between the phosphine source 24 and the gas mixer 26 to measure the flow rate of inert substance flowing from the source 24 and to vary the rate of flow, respectively. In addition, a gas sensor 36 is provided to sense concentration of phosphine and/or concentration of inert substance in the gaseous mixture flowing from the gas mixer 26. Optionally, the gas sensor 36 also measures the flow rate of the gaseous mixture produced in the gas mixing system 20.

A controller 38, which includes one or more microprocessors, preferably controls operation of both the overall gas fumigation system shown in FIG. 1 and the gas mixing system 20 show in FIG. 2. During control of the gas mixing system 20, the controller 38 receives signals from the inert substance flow meter 28, the inert substance flow valve 30, the phosphine flow meter 32, the phosphine flow valve 34, and the gas sensor 36, and sends controlling signals to the inert substance flow valve 30 and the phosphine flow valve 34 to control flow of the inert substance and/or the phosphine flowing to the gas mixer 26.

Preferably, the controller 38 controls the flow of the phosphine and the flow of the inert substance prior to mixing in the gas mixer 26 to ensure that the phosphine is sufficiently diluted with the inert substance to create a non-flammable mixture. In addition, the controller 38 optionally controls the mixing of the inert substance and the phosphine based on sensed conditions of the gas fumigation system, such as concentrations of phosphine for atmosphere in the regions 44a–44c and temperatures in the regions 44a–44c, as explained below.

In an embodiment of the invention, the gas mixing system 20 shown in FIG. 2 is mounted on a wheeled chassis, such as a trailer, or on a vehicle, such as an automobile, a boat, or a railroad car, so that the gas mixing system 20 may be transported to different locations and connected to regions requiring fumigation. Alternatively, the gas mixing system 20 is mounted on a vehicle and supplies gaseous mixture to a region located on the vehicle itself.

As shown in FIG. 1, the recycling passage 42 includes a common feed passage 46, a common exhaust passage 48, branch inlet passages 50a, 50b, and 50c in direct fluid communication with respective regions 44a–44c, and branch outlet passages 52a, 52b, and 52c also in direct fluid communication with respective regions 44a–44c. A blower 54 is positioned in the recycling passage 42 between the common exhaust passage 48 and the common feed passage 46. The controller 38 regulates the flow through the blower 54 to control flow through the recycling passage 42 and the regions 44a–44c. Preferably, the controller 38 operates the blower continuously during fumigation to ensure adequate distribution of gaseous mixture through the regions 44a–44c.

Sensor 80 monitors operation of the blower 54 and sends corresponding signals to the controller 80. Preferably, the sensor 80 is a pressure sensor or motor current sensor capable of detecting whether the blower 54 is operating properly.

During operation of the blower 54, the branch outlet passages 52a–52c remove a portion of the atmosphere in respective regions 44a–44c and feed this atmosphere into the common exhaust passage 48. After passing through the common exhaust passage 48, the common feed passage 46 distributes the atmosphere to each of the branch inlet passages 50a–50c, which then feed the atmosphere to the respective regions 44a–44c. The flow in the recycling passage 42 causes flow through the regions 44a–44c and mixing of atmosphere from each of the regions 44a–44c. This provides fumigation of essentially all of the space in the regions 44a–44c and conserves the amount of gaseous mixture used during fumigation. Conservation of the gaseous mixture is beneficial because it reduces the amount of phosphine that could be released into the environment.

Valves 62a, 62b, and 62c are provided in respective branch inlet passages 50a–50cto control flow of the atmosphere to each of the individual regions 44a–44c. The valves 62a–62c are either manual flow control valves or automatic valves controlled by the controller 38. When one or more of the regions 44a–44c is empty and does not require fumigation, the corresponding valves 62a–62c are closed to prevent flow to these regions and conserve the gaseous mixture.

As shown in FIG. 1, a recycle flow feed line 56 is coupled between the supply line 40 and the common feed passage 46, and region feed lines 58a, 58b, and 58c are coupled between the supply line 40 and respective branch inlet passages 50a–50c. The recycle flow feed line 56 passes the gaseous mixture from the supply line 40 to the common feed passage 46, and the region feed lines 58a–58c pass the gaseous mixture from the supply line 40 to the respective branch inlet passages 50a–50c. This configuration allows for introduction of the gaseous mixture into the recycling passage and into each the regions 44a–44c during fumigation of each of the regions 44a–44c.

A valve 59 is positioned in the recycle flow feed line 56 to regulate flow of the gaseous mixture through the recycle flow feed line 56. Similarly, valves 60a, 60b, and 60c are positioned in respective region feed lines 58a–58c to regulate flow of the gaseous mixture through each of the region feed lines 58a–58c. Preferably, the valves 59 and 60a–60c are automatic flow control valves controlled by the controller 38 in response to various sensed conditions of the system, as explained below.

Preferably, structure is provided to vent atmosphere from the regions 44a–44c to ambient air. As shown in FIG. 1, a valve 64, optionally controlled by the controller 38, selectively places the common exhaust passage 48 in flow communication with a vent 66. The vent 66 is in flow communication with ambient air outside of the system and preferably includes a scrubber or filter 68 for removing potentially dangerous gases, such as phosphine.

An ambient air intake 70 is also provided to introduce ambient air into the recycling passage 42 and the regions 44a–44c. A valve 72 positioned in the common exhaust passage 48 is movable between a first position, in which the valve 72 allows recycle flow of atmosphere through the common exhaust passage 48 and blocks flow through the intake 70, and a second position, in which the valve 72 blocks recycle flow through the common exhaust passage 48 and allows flow of ambient air from the air intake 70 into a portion of the common exhaust passage 48 between the valve 72 and the blower 54.

Preferably, the controller 38 controls movement of the valve 72 between the first and second positions to selectively introduce ambient air into the regions 44a–44c. To dilute potentially harmful gases in the regions 44a–44c rapidly, for example, when workers are to enter the regions 44a–44c, or when product is to be removed from the regions 44a–44c, the controller 38 places both the air intake 70 and vent 66 in flow communication with the common exhaust passage 48.

Various sensors are provided to sense conditions of the system during a fumigation procedure and to provide feedback signals to the controller 38 based on the sensed conditions. As shown in FIG. 1, phosphine sensors 74a, 74b, and 74c are provided to sense concentrations of phosphine in the respective regions 44a–44c and to send corresponding signals to the controller 38. Phosphine sensors 76a, 76b, and 76c are also provided to sense concentrations of phosphine for atmosphere flowing in respective branch outlet passages 52a–52c and to send corresponding signals to the controller 38. In addition, phosphine sensor 78 is provided to sense phosphine concentrations in the recycling passage 42 at the inlet of the blower 54 and to send corresponding signals to the controller 38. Optionally, the phosphine sensors 74a–76b, 76a–76c, and 78 are placed in sample lines (not shown) communicating with vents so that phosphine concentrations of samples can be sensed in the sample lines.

The controller 38 controls the valves 30, 34, 59, 60a–60c, and 62a–62c and the blower 54 in response to the phosphine concentrations sensed by the phosphine sensors 74a–74c, 76a–76c, and 78. This enables the controller 38 to regulate the phosphine concentration for each of the regions 44a–44c during a fumigation procedure. Preferably, the controller 38 manages the phosphine concentration in the regions 44a–44c to conserve the gaseous mixture while effectively fumigating pests in the regions 44a–44c.

For example, the controller 38 maintains a phosphine concentration in the regions 44a–44c of from about 10 ppm to about 700 ppm, or from about 20ppm to about 250ppm. During pest fumigation, the controller 38 establishes and maintains a predetermined phosphine concentration in the regions 44a–44c for a period of time sufficient to eliminate any pests, and then the controller 38 maintains the phosphine concentration at a level below the predetermined level to reduce the likelihood of pest entry into the regions. In addition, the controller 38 increases phosphine concentrations when pests may have entered the regions 44a–44c or become more active in the regions 44a–44c, such as when food products or crops are placed in the regions 44a–44c.

Preferably, the controller 38 adjusts the concentration of phosphine in each of the regions 44a–44c based on conditions related to the likelihood of pest activity in the regions 44a–44c. The controller 38 preferably conserves the amount of gaseous mixture used in the regions 44a–44c to provide optimal pest control at a minimal cost and with a reduced risk of releasing potentially toxic levels of gases into the environment.

As shown in FIG. 1, temperature sensors 82a, 82b, and 82c are provided in respective regions 44a–44c. The temperature sensor 82a–82c sense temperature in the regions 44a–44c and provide corresponding signals to the controller 38 to allow for control of the phosphine concentrations in the regions 44a–44c based on this sensed temperature. At cooler temperatures, certain pests become dormant or inactive, and at relatively higher temperatures some regions to be fumigated experience a chimney effect in which extreme temperature gradients heat gases and force them rapidly upwards. In addition, phosphine pest fumigation is more effective at higher temperatures. The controller 38 preferably adjusts the concentrations of phosphine in the regions 44a–44c to compensate for the effects of temperature fluctuations.

The gas fumigation system also preferably includes phosphine sensors 84a, 84b, and 84c, an electronic data recorder 86, and an audible and visual warning alarm 88. The phosphine sensors 84a–84c are situated outside of the regions 44a–44c and recycle passage 42 to detect any leakage of phosphine from the system into the ambient air surrounding the system. The phosphine sensors 84a–84c provide a "fence line" monitoring of the area surrounding the system and could be any type of gas sensor, such as a laser beam sensor or point sensor.

The controller 38 receives signals from the phosphine sensors 84a–84c and stores data regarding the sensed phosphine concentrations in the data recorder 90. If the concentration of phosphine sensed by the sensors 84a–84c reaches an unsafe level, the controller 38 preferably activates the alarm 88 to warn individuals in the area about the increased levels of phosphine. In addition, the controller 38 also preferably closes the valves 30, 34, 59, 60a–60c, and 62a–62c and deactivates the blower 52 to prevent additional leakage of phosphine from the system.

Preferably, a communication device 90 is connected to the controller 38 to allow for remote monitoring and control of the gas fumigation system via another corresponding communication device (not shown). The communication device 90 is any type of device capable of sending and receiving data so that the controller 38 can be monitored and adjusted. For example, the communication device 90 may be a conventional telephone modem, a wireless telephone modem, a radio, or any other type of communication device allowing two way exchange of information.

The recorder 86 preferably stores a historical record of concentrations sensed by the sensors 36, 74a–44c, 76a–76c, 78, and 84a–84c and temperatures sensed by the temperature sensors 82a–82c during product storage in the regions 44a–44c. The recorder 86 also preferably stores input information about the type of product stored in the regions 44a–44c, the primary types of pests in the regions 44a–44c, the degree of pest activity, and weather conditions outside of the regions 44a–44c, such as temperature, humidity, and wind speed. The communication device 90 is capable of transmitting data from the historical record of the recorder 86 so that operation of the system over time may be monitored from a remote location. In addition, the recorder 86 preferably includes a printer or display for providing a visual output of the stored information.

Methods of fumigating pests with the structure shown in FIGS. 1 and 2 are discussed below. Although the invention is described in association with this structure, the method of the invention in its broadest sense could be practiced with other structures.

During a pest fumigation procedure, the controller 38 initiates operation of the blower 54 to establish flow in the recycling passage 42. The flow in the recycling passage 42 draws atmosphere from the regions 44a–44c via the branch outlet passages 52a–52c and returns atmosphere to the regions 44a–44c via the branch inlet passages 50a–50c.

When the gaseous mixture source 10 is a pressure vessel containing the gaseous mixture, a valve on the vessel is opened to allow flow of the gaseous mixture from the source 10. When the gaseous mixture source 10 includes the gas mixing system 20 shown in FIG. 2, flow of the inert substance, such as carbon dioxide and/or nitrogen, and flow of phosphine is initiated from the respective sources 22 and 24. If the inert substance source 22 is an inert substance generator, the inert substance generator generates the inert substance preferably throughout a fumigation process. Similarly, if the phosphine source 24 is a phosphine generator, the phosphine generator generates the phosphine throughout fumigation. Optionally, the inert substance source 22 includes a pressure vessel containing the inert substance, and/or the phosphine source 24 includes a pressure vessel containing the phosphine.

The controller 38 controls the inert substance flow valve 30 and phosphine flow valve 34 to mix the non-flammable mixture of the phosphine and inert substance in the mixer 26. The controller 38 receives signals from the inert substance flow meter 28, the phosphine flow meter 32, and the gas sensor 36 to adjust flow through the valves 30 and 34 based on flow rate of the inert substance, flow rate of the phosphine, concentration of the phosphine and/or inert substance in the mixture, and optionally the flow rate of the mixture. The information provided by the flow meters 28 and 32 and the gas sensor 36 allows the controller 38 to constantly monitor and manage the relative concentrations of inert substance and phosphine in the gaseous mixture to ensure that the mixture is non-flammable. In addition, the gas mixing system 20 is capable of adjusting the relative proportions of the phosphine and the inert substance during fumigation.

Although the gas mixing system 20 preferably mixes the phosphine and inert substance throughout the fumigation process, the controller 38 optionally also controls the valves 30 and 34 to allow for flow of the inert substance alone rather than the gaseous mixture.

When the gaseous mixture flows through the supply line 40 from the source 10, the controller 38 controls the valves 59 and 60a–60c to allow for flow of the gaseous mixture into the recycling passage 42 and the regions 44a–44c. Initially the gaseous mixture is diluted when it combines with the atmosphere present in the regions 44a–44c and the recycling passage 42 before initiation of gas fumigation. Over time, more gaseous mixture flows into the recycling passage 42 and the regions 44a–44c, and eventually the concentration of phosphine in the regions 44a–44c increases to a pesticidal level.

The flow in the recycling passage 42 provides mixing of the atmospheres of each of the regions 44a–44c. This recycle flow maintains relatively uniform concentrations of phosphine throughout each of the regions 44a–44c during fumigation. In addition, the recycle flow reduces the amount of gaseous mixture required during fumigation because the gaseous mixture initially introduced into the recycling passage 42 and the regions 44a–44c continuously passes through the regions 44a–44c.

As gas flows from the gas supply 10, the controller 38 receives input from the phosphine sensors 74a–74c and 76a–76c to determine the phosphine concentration in the atmosphere of the regions 44a–44c. The controller 38 also receives input from the phosphine sensor 78 and the temperature sensors 82a–82c to determine the concentration of phosphine in the recycle flow and the temperature in the regions 44a–44c.

Based on the sensed phosphine concentrations and temperatures, the controller 38 controls the valves 30, 34, 59, 60a–60c, and 62a–62c and the blower 54 to regulate the phosphine concentration in each of the regions 44a–44c. The controller 38 optionally controls the valves 30, 34, 59, 60a–60c, and 62a–62c in a number of different ways to modify flow. For example, the controller 38 controls the valves 30, 34, 59, 60a–60c, and 62a–62c to provide for continuous, continuous and variable, or pulsing flow of the gaseous mixture to each of the regions 44a–44c.

In the embodiment shown in FIG. 1, the controller 38 varies rate of a continuously operating blower 54 to modify flow through the recycling passage 42. However, the flow through the recycling passage 42 can be varied in other ways and by other means. For example, the flow in the recycling passage 42 could be pulsed by operating the blower 54 intermittently. In addition, the blower 54 could have a bypass selectively placing the inlet of the blower 54 in flow communication with the outlet of the blower 54, a throttle opening could be provided in the recycling passage 42, or multiple blowers could be provided. Optionally, the controller 38 monitors operation of the blower 54 via signals from the sensor 80 and ceases flow of the gaseous mixture in the event of failure of the blower 54.

When phosphine drops to a sufficiently low concentration in the regions 44a–44c, for example, due to leakage from walls of the regions 44a–44c, the controller 38 continues the supply of the gaseous mixture and adjusts flow of the gaseous mixture to make up for the loss. Preferably, the controller 38 maintains a predetermined concentration of phosphine in the regions 44a–44c for a sufficient amount of time to exterminate any pests in the regions 44a–44c. Thereafter, the controller 38 maintains a lower concentration of phosphine in the regions 44a–44c to ensure that pests will not attempt to reinfest the regions 44a–44c.

The controller 38 preferably increases the concentration of phosphine in the regions 44a–44c when pest infestations are more likely. For example, the controller 38 preferably increases the concentration of phosphine in the regions 44a–44c after a product, such as grain, is added to the region. This increase of phosphine concentration fumigates any pests in the added product.

During fumigation, the controller 38 preferably monitors the phosphine concentration sensors 84a–84c to detect increased concentrations of phosphine leaking from the regions 44a–44c or other areas of the gas fumigation system. The recorder 86 maintains a record of the concentrations sensed by the sensors 84a–84c to allow for monitoring of the system. When the sensors 84a–84c sense potentially unsafe concentrations of phosphine, the controller 38 activates the alarm 88 to provide a warning to individuals in the area, and the controller 38 closes the valves 30, 34, 59, 60a–60c, and 62a–62c to prevent additional leakage from the system.

If desired, the fumigation process and information stored in recorder 86 can be monitored with a display screen or printer associated with the recorder 86 or from a remote location via the communication device 90. If adjustments to the fumigation process are desired, the communication device 90 allows for adjustment of the process from the remote location.

At the completion of the fumigation process, the controller 38 preferably adjusts the valve 64 and the valve 72 to vent atmosphere from the regions 44a–44c through the vent 66 and to introduce fresh ambient air through the air intake 70. After a sufficient amount of time, this diminishes the amount of gaseous mixture in the regions 44a–44c so that individuals may enter the regions 44a–44c, or so that product in the regions 44a–44c may be shipped or processed.

Because the gas mixing system 20 and gas fumigation system regulate and control flows of gases, the present invention allows for controlled dosing of particular amounts of phosphine in each the regions 44a–44c and for relatively instantaneous start up and shut down of gas flows. Controlling flow of the gaseous mixture to the regions 44a–44c, rather than generation of phosphine in the regions, reduces the likelihood of residue being left in the regions 44a–44c and eliminates the need for high humidity or external water supply to the regions 44a–44c.

The present invention flows non-flammable gaseous mixtures into the regions 44a–44c, rather than allowing flammable concentrations of phosphine to be introduced or build up in the regions 44a–44c. Therefore, the present invention is safer than other phosphine fumigation methods and systems.

In particular, the present invention has a significant number of advantages as compared to pest fumigation approaches in which phosphine is generated from metal phosphides without providing for control of gas flow or control of gas mixing. Risk of fire is extremely low because the gaseous mixture is non-flammable and diluted initially when the mixture combines with atmosphere in the regions 44a–44c. The release and control of the gaseous mixture is relatively independent of climatic conditions, such as temperature. In particular, the present invention can perform fumigation when the temperature is below 40 degrees Fahrenheit.

Potential worker exposure to high concentrations of phosphine is minimized because the non-flammable gaseous mixture is contained in fluid handling equipment. In addition, workers do not have to enter the regions 44a–44c and perform tasks, such as removal and disposal of residual matter. This reduces the number of workers required to perform fumigation.

The present invention provides control and direct measurement of phosphine release and termination of the release on demand. Control of flow in the recycling passage 42 can be used to provide a desired concentration of phosphine in the regions 44a–44c. The method and system of the present invention can establish a uniform pesticidal atmosphere at a rate dependent upon the geometry of the regions 44a–44c and the rate of recycle flow.

Rather than relying on liquid chemicals, the method and system of the present invention can maintain a relatively low concentration of phosphine in the regions 44a–44c over a period of time to reduce infestations by mobile pests. Products in the regions 44a–44c are available for use as soon as the phosphine is ventilated from the regions 44a–44c without requiring a significant quarantine period. In addition, the gaseous mixture fumigates pests without the need to move the product in the regions 44a–44c during fumigation.

It will be apparent to those skilled in the art that various modifications and variations can be made to the structure of the present invention without departing from the scope or spirit of the invention. For example, the present invention could be used to manage flow of flammable gases other than phosphine or to provide for fumigation of a single region, rather than a plurality of regions. In addition, the gas mixing system of FIG. 2 could be used in combination with a gas fumigation system different from that shown in FIG. 1. In view of the foregoing, it is intended that the present invention cover modifications and variations of this invention provided they fall within the scope of the following claims and their equivalents.

What is claimed is:

1. A system for gas fumigating at least one region, comprising:
   a phosphine source;
   an inert substance source;
   a mixer fluidly coupled to the phosphine source and the inert substance source to form a gaseous mixture including phosphine flowing from the phosphine source and inert substance flowing from the inert substance source, the gaseous mixture passing from the mixer to the region during gas fumigation; and
   a flow controller controlling at least one of flow of the phosphine from the phosphine source to the mixer and flow of the inert substance from the inert substance source to the mixer so that the gaseous mixture is non-flammable in air.

2. The gas fumigation system of claim 1, wherein the inert substance is selected from the group consisting of carbon dioxide, nitrogen, and a mixture of carbon dioxide and nitrogen.

3. The gas fumigation system of claim 1, further comprising a sensor for sensing at least one of concentration of the phosphine in the gaseous mixture and concentration of the inert substance in the gaseous mixture, the flow controller receiving input from the sensor to control flow based on the sensing.

4. The gas fumigation system of claim 1, further comprising a sensor for sensing concentration of the phosphine for atmosphere of the region, the flow controller receiving input from the sensor to regulate at least one of flow of the gaseous mixture, flow of the phosphine from the phosphine source, and flow of the inert substance from the inert substance source based on the sensed concentration.

5. The gas fumigation system of claim 1, further comprising a temperature sensor for sensing temperature in the region, the flow controller receiving input from the temperature sensor to regulate at least one of flow of the gaseous mixture, flow of the phosphine from the phosphine source, and flow of the inert substance from the inert substance source based on the sensed temperature.

6. The gas fumigation system of claim 1, further comprising a recycling passage for removing a portion of atmosphere from the region and returning the portion back to the region so as to create a recycle flow for the atmosphere, the recycling passage being in fluid communication with the mixer so that the gaseous mixture combines with the recycle flow.

7. The gas fumigation system of claim 1, wherein the flow controller comprises a phosphine flow valve configured to regulate flow of phosphine from the phosphine source to the mixer.

8. The gas fumigation system of claim 7, wherein the flow controller further comprises a valve controller configured to control the phosphine flow valve so that the gaseous mixture is non-flammable in air.

9. The gas fumigation system of claim 8, wherein the flow controller further comprises an inert substance flow valve configured to regulate flow of inert substance from the inert substance source to the mixer, and wherein the valve controller is configured to control both the phosphine flow valve and the inert substance flow valve so that the gaseous mixture is non-flammable in air.

10. The gas fumigation system of claim 9, further comprising a phosphine flow meter configured to measure the flow rate of phosphine flowing from the phosphine source to the mixer, and an inert substance flow meter configured to measure the flow rate of inert substance flowing from the inert substance source to the mixer, wherein the valve controller receives input from the phosphine flow meter and the inert substance flow meter to control the valves based on the measured flow rates.

11. The gas fumigation system of claim 1, wherein the flow controller comprises an inert substance flow valve configured to regulate flow of inert substance from the inert substance source to the mixer, and a valve controller configured to control the inert substance flow valve so that the gaseous mixture is non-flammable in air.

12. The gas fumigation system of claim 1, further comprising a phosphine flow meter configured to measure the flow rate of phosphine flowing from the phosphine source to the mixer.

13. The gas fumigation system of claim 12, wherein the flow controller receives input from the phosphine flow meter.

14. The gas fumigation system of claim 13, further comprising an inert substance flow meter configured to measure the flow rate of inert substance flowing the inert substance source to the mixer, wherein the flow controller receives input from the inert substance flow meter.

15. The gas fumigation system of claim 1, further comprising an inert substance flow meter configured to measure the flow rate of inert substance flowing from the, inert substance source to the mixer.

16. The gas fumigation system of claim 13, wherein the flow controller receives input from the inert substance flow meter.

17. The gas fumigation system of claim 1, wherein the flow controller is configured to control flow of at least phosphine from the phosphine source to the mixer so that the gaseous mixture is non-flammable in air.

18. The gas fumigation system of claim 1, wherein the flow controller is configured to control both the flow of phosphine from the phosphine source to the mixer and the flow of inert substance from the inert substance source to the mixer so that the gaseous mixture is non-flammable in air.

* * * * *

UNITED STATES PATENT AND TRADEMARK OFFICE
CERTIFICATE OF CORRECTION

PATENT NO.    : 6,615,534 B1  
DATED         : September 9, 2003  
INVENTOR(S)   : Dennis Smithyman et al.

It is certified that error appears in the above-identified patent and that said Letters Patent is hereby corrected as shown below:

Column 14,  
Line 21, after "flowing", please insert -- from --.  
Line 26, after "the", please delete the comma.

Signed and Sealed this

Fourth Day of November, 2003

JAMES E. ROGAN  
*Director of the United States Patent and Trademark Office*